United States Patent
Thottupurathu

(10) Patent No.: US 7,812,081 B2
(45) Date of Patent: *Oct. 12, 2010

(54) METHODS OF MAKING A MIXTURE FOR A PTFE MEMBRANE WITH INORGANIC MATERIALS, AND COMPOSITIONS RELATED THERETO

(75) Inventor: Gopakumar Thottupurathu, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/037,501

(22) Filed: Feb. 26, 2008

(65) Prior Publication Data

US 2009/0212469 A1  Aug. 27, 2009

(51) Int. Cl.
*C08K 3/22* (2006.01)

(52) U.S. Cl. ............... 524/430; 524/431; 524/432; 524/433; 524/544; 524/545; 524/546

(58) Field of Classification Search ............... 524/430, 524/431, 432, 433, 544, 545, 546
See application file for complete search history.

(56) References Cited

U.S. PATENT DOCUMENTS

| | | | |
|---|---|---|---|
| 4,824,898 A * | 4/1989 | Sukigara et al. ............ 524/401 |
| 5,697,390 A | 12/1997 | Garrison et al. | |
| 5,827,327 A | 10/1998 | McHaney et al. | |
| 5,886,066 A * | 3/1999 | Forschirm ................ 523/200 |
| 6,120,532 A | 9/2000 | Goldfarb | |
| 6,218,000 B1 | 4/2001 | Rudolf et al. | |
| 6,270,707 B1 | 8/2001 | Hori et al. | |
| 6,416,840 B1 * | 7/2002 | Miyamori et al. .......... 428/66.4 |
| 6,476,116 B1 * | 11/2002 | Egami et al. ............ 524/495 |
| 2006/0142467 A1 * | 6/2006 | Park ..................... 524/495 |

FOREIGN PATENT DOCUMENTS

WO  WO 2006/117679  11/2006

OTHER PUBLICATIONS

U.S. Appl. No. 12/037,404.
Great Britain Search Report issued for Great Britain Patent Application No. GB0902513.1, dated Jul. 7, 2009.
Great Britain Search Report issued for Great Britain Patent Application No. GB0902515.6, dated Nov. 27, 2009.

* cited by examiner

*Primary Examiner*—Bernard Lipman
(74) *Attorney, Agent, or Firm*—Nixon & Vanderhye P.C.

(57) ABSTRACT

Method for making a mixture used in the production of a polytetrafluoroethylene (PTFE) membrane including porous inorganic materials. The mixture includes PTFE resin, a lubricating agent, and a porous inorganic material. The mixture may be further processed to form a PTFE membrane.

3 Claims, No Drawings

US 7,812,081 B2

METHODS OF MAKING A MIXTURE FOR A PTFE MEMBRANE WITH INORGANIC MATERIALS, AND COMPOSITIONS RELATED THERETO

BACKGROUND OF THE INVENTION

Embodiments of the present invention generally relate to making an expanded polytetrafluoroethylene (ePTFE) membrane containing porous inorganic materials.

Materials including polytetrafluoroethylene (PTFE) are known in the art. PTFE has various well-established uses, including, for example, applications requiring lubricity (e.g., bearings, bushings, etc.) and applications requiring a porous membrane. These membrane-related applications may include, for example, filtration, venting, and/or diffusion/barrier applications. Filtration may use discs or sheets.

Additive-containing PTFE products are known. See, e.g., U.S. Pat. No. 5,697,390 to Garrison et al.; U.S. Pat. No. 5,827,327 to McHaney et al.; U.S. Pat. No. 6,120,532 to Goldfarb; and U.S. Pat. No. 6,270,707 to Hori et al.

BRIEF DESCRIPTION OF THE INVENTION

In an embodiment of the present invention, there is a method for making a polytetrafluoroethylene membrane comprising porous inorganic materials. The method may comprise the steps of: (a) mixing a polytetrafluoroethylene resin having a weight, a lubricating agent having a weight, and a porous inorganic material having a weight, wherein the weight of the lubricating agent comprises between 15 and 25 percent of the weight of the polytetrafluoroethylene resin, wherein the weight of the porous inorganic material comprises up to 10 percent of the weight of the polytetrafluoroethylene resin, and wherein the porous inorganic material has at least one dimension less than 100 nm; (b) forming a preform comprising a mixture of the polytetrafluoroethylene resin, the lubricating agent, and the porous inorganic material; (c) extruding the preform to form a tape having a thickness between 1 and 100 mil; (d) calendaring the tape to facilitate evaporation of the lubricating agent; (e) tentering the tape through biaxially stretching in a first direction and a second direction perpendicular to the first direction to form a membrane; and (f) sintering the membrane at a temperature between 400° F. and 750° F. for a period of time between 1 and 120 seconds, wherein the membrane after sintering has a thickness between 0.05 and 20 mil.

In an embodiment of the present invention, there is a method of incorporating a porous inorganic material into a mixture comprising a polytetrafluoroethylene resin and a lubricating agent. The method may comprise the steps of: (a) mixing the polytetrafluoroethylene resin with the lubricating agent in a V blender for a period of time between 1 and 60 minutes to form a resin/lubricant mixture; (b) wicking the resin/lubricant mixture for a period of time between 1 and 120 hours; and (c) mixing the resin/lubricant mixture with the porous inorganic material in a V blender for a period of time between 1 and 60 minutes; wherein a weight of the lubricating agent comprises between 15 and 25 percent of a weight of the polytetrafluoroethylene resin, wherein a weight of the porous inorganic material comprises up to 10 percent of the weight of the polytetrafluoroethylene resin, and wherein the porous inorganic material has at least one dimension less than 100 nm.

In an embodiment of the present invention, there is a composition comprising: a polytetrafluoroethylene resin; a lubricating agent comprising an isoparaffinic solvent; and a porous inorganic material; wherein a weight of the lubricating agent comprises between 15 and 25 percent of a weight of the polytetrafluoroethylene resin; wherein a weight of the porous inorganic material comprises up to 10 percent of the weight of the polytetrafluoroethylene resin; and wherein the porous inorganic material has at least one dimension less than 100 nm and has a specific surface area greater than 50 $m^2/g$.

DETAILED DESCRIPTION OF THE INVENTION

Certain aspects of the present invention may related to extruding into tape polytetrafluoroethylene (PTFE) that includes porous inorganic materials and/or composites, then converting the extruded PTFE tape into a membrane through biaxial stretching.

In certain embodiments, a combination of PTFE and inorganic porous materials (e.g., composites) may be prepared by dispersing inorganic porous materials such as activated carbon, carbon nanotubes, zeolites, silicon dioxide, and other nanomaterials into a mixture containing PTFE resin. The PTFE composite may be then extruded into tape and converted into a membrane by biaxial stretching.

A membrane containing porous inorganic particles may have a high porosity/surface area and may be used, at least in some instances, as a catalyst for decontamination. In some embodiments, for example, membranes containing porous materials may be used in the filtration of toxic gas(ses). Furthermore a dimensionally stable membrane containing porous inorganic materials may be used as a filter media for gas separation and/or liquid separation.

In some exemplary embodiments, for instance, it may be possible to create a microporous membrane containing nano- and/or micro-sized complex flow channels on the membrane cell walls for the filtration of gas on a molecular level.

A PTFE membrane may be chemically inert and typically has a very low surface energy. In certain embodiments, that chemical stability (and/or other beneficial characteristics of a PTFE membrane) may be combined with the nanoporous structure of inorganic materials. For example, the adsorption capability of porous inorganic material may be useful in trapping toxic molecules present in the air that contact the PTFE/inorganic material matrix. For another example, a membrane containing porous materials may be useful as a storage medium for decontaminating toxic treatment agents.

In at least some embodiments, the PTFE membrane containing inorganic material may be used in the separation and/or purification of gas. Ion exchange composite resins may be prepared from membrane containing active porous materials. Large surface area and tunable surface properties may be notable characteristics of such membranes.

In certain embodiments, inorganic porous materials may include, for example, any small particle with at least one dimension less than 100 nm. Preferably, the small particles have at least one dimension less than 50 nm, and even more preferably the particles have at least one dimension less than 30 nm. Exemplary inorganic porous materials may include activated carbon, carbon nanotubes, carbon fibers, zeolites or other catalysts, silicon dioxide, etc. Suitable nanoparticles may have a high surface area to volume (or mass) ratio. For example, suitable nanoparticles may have a specific surface area of greater than 10 $m^2/g$, greater than 50 $m^2/g$, or greater than 90 $m^2/g$. In some embodiments, the specific surface area may be about 100 $m^2/g$. A suitable inorganic porous material may comprise Activated Carbon Nanopowder available from Aldrich Chemical Co.

Activated nanocarbon, for example, may impart properties such as abrasion resistance and/or thermal and electrical conduction and may also improve mechanical properties (e.g., strength, durability, longevity, etc.).

In preferred embodiments, certain aspects of the present invention relate to a method of making a PTFE membrane containing a porous inorganic material. In general, the steps may include one or more of the following steps: (1) mixing PTFE resin with a lubricating agent, then wicking the resin/lubricant mixture; (2) mixing the resin/lubricant mixture with a porous inorganic material (such as an activated nanocarbon); (3) preforming the wet-mixture into a billet; (4) extruding the mixture into tape; (5) calendaring the tape; (6) biaxially stretching the tape to form a membrane; and (7) sintering the membrane to stabilize its microstructure.

Due to the use of a lubricating agent that is removed from the extrudate following the application of heat, this process may be generally known as a "wet-process" and not a "dry-process" (which generally relies on friction-free air blending in an environment without shear).

In an exemplary embodiment, a suitable PTFE resin comprises Dupont Teflon® PTFE 601A, available from E. I. du Pont de Nemours and Co. Other PTFE resins may comprise Daikin F107, Dupont 603A, and/or Dupont 60A. And in an exemplary embodiment, a suitable lubricating agent includes a hydrocarbon-based liquid, such as the isoparaffinic solvents sold under the Isopar tradename by the ExxonMobil Chemical Co. A preferred lubricating agent may comprise Isopar K, Isopar M, and/or Isopar G. The PTFE resin powder may be mixed with the lubricating agent in a V blender for between 1 and 60 minutes (preferably about 30 minutes), for example, until the mixture is approximately homogenous. In certain embodiments, the weight percentage of the lubricating agent may range between 15 and 25% (and all subranges therebetween) of weight of the resin. This weight percentage, which is commonly known as the "lube rate," may vary, for example, depending on the specific processing parameters of the equipment being used in the extrusion process.

Wicking occurs after mixing, and the resin/lubricant mixture may be held at a temperature of 90° F. for 18 hours. In certain embodiments, the temperature may be higher (e.g., 200° F.) or lower (e.g., 40° F.), and the time may be shorter (e.g., 1 hour) or longer (e.g., 120 hours). In other embodiments, the wicking may be optional.

The wicked resin/lubricant mix may then be mixed with porous inorganic material using a V blender, e.g., at ambient temperature for between 1 and 60 minutes, preferably between 15 and 30 minutes. In some embodiments, the porous inorganic material comprises up to 10 wt % of the PTFE resin. In other embodiments, the porous inorganic material comprises up to 5 wt % of the PTFE resin. In yet further embodiments, the porous inorganic material comprises up to 3 wt % of the PTFE resin.

In certain embodiments, the lubricating agent may assist in dispersing the porous inorganic materials. In certain embodiments, the porous inorganic material may be mixed with the resin and/or lubricant in various permutations. For example, they may be all mixed together at the same time, or the lubricant and porous inorganic material may be mixed prior to mixing with the PTFE resin.

The resin/lubricant/additive mixture may then be preformed, e.g., through charging into a cylinder, then pressed under pressure to form a preform. In some embodiments, the cylinder may be 50 inches, and the 150 psi of pressure is used to force the mixture into the preform at ambient temperature. Of course, other process parameters may also be used.

The preform may then be extruded into tape, e.g., Ram extruder. In some embodiments, the extrusion occurs at a temperature between 80° F. and 100° F. and at a rate between 80 and 200 in/min. The final thickness of the tape may vary between 1 and 100 mil, preferably between 5 and 75 mil, and even more preferably between 10 and 40 mil. Of course, other process parameters may also be used.

After extrusion, the tape may then be calendared, by passing the mixture through hot calendar rolls to facilitate the obtainment of tape uniformity as well as the evaporation of the lubricating agent. The calendaring may occur at a temperature between 300° F. and 400° F. and at a rate between 10 and 20 ft/min. The calendar rolls may be 20 inches wide, and calendar rolls may be spaced between 10 and 17 mil apart. Of course, other process parameters may also be used.

After calendaring, the tape may then be formed into a membrane via tentering. During this process, the tape is stretched biaxially to form a thin membrane. Preferably, the stretching occurs at a line speed between 30 ft/min and 80 ft/min. Preferably, the stretching occurs multiple times, even in the same direction. For example, the tape may be stretched between 1 and 20 times (preferably between 10 and 12 times) in the transverse direction and between 1 and 5 times (preferably 3 times) in the machine direction. Various temperatures may be used, e.g., between 150° F. and 800° F., such as, for example, at 200° F., at 500° F., at 650° F., or at 700° F. These temperatures may increase or otherwise vary with the stretch cycles.

After tentering, the membrane may be heat treated to stabilize the microstructure of a membrane. This sintering may occur in an oven at a temperature between 400° F. and 750° F., preferably between 650° F. and 750° F., for a period of time between 1 and 120 seconds, and preferably between 10 and 30 seconds. The final thickness of the membrane may range between 0.05 and 20 mil (preferably 2 mil).

Two examples were prepared in accordance with exemplary embodiments of the present invention. Example No. 1 was prepared with 1.9 wt % Activated Carbon Nanopowder (using the weight of the PTFE resin as the basis). Example No. 2 was prepared with 3.8 wt % Activated Carbon Nanopowder (using the weight of the PTFE resin as the basis). The PTFE resin used was Dupont Teflon® PTFE 601A, and the lubricating agent was Isopar K. The resulting membranes were compared to the specifications for two commercially available PTFE membranes from GE Energy: QMO8 and QMO11.

Example No. 1

DuPont 601 A resin fine powder was mixed with 20 wt % of Isopar K using a V blender at ambient condition for about 30 min. The resin/isopar mix was wicked at 90° F. for 24 hours. The wicked PTFE/Isopar mix was blended with 1.9 wt % of activated nanocarbon using a V blender for about 15 min. The resin/isopar/carbon was shaped into cylindrical form (perform) by pressure of 150 psi using a billet press. The perform was extruded into a tape at a temperature 80° F. using a Ram extruder. The isopar was removed from the tape with thickness ~20 mil by passing it through series of hot calendar rolls at a temperature of 200° F. The tape was stretched biaxially to form a porous PTFE membrane (stretched 2 times in the machine direction and 8 times in the transverse direction). The microstructure of PTFE membrane was stabilized by applying heat at temperature of 680° F.

The membrane was tested as per product test specifications and compared with GE standard commercialized membrane. It was found that the Nanocarbon additive dispersed uniformly within PTFE matrix and locked in the microstructure.

TABLE 1

Comparison of Example No. 1 with specifications for QMO 11 and QMO 8.

| Membrane Characteristics | Example No. 1 | QMO11 | QMO8 |
|---|---|---|---|
| Lube Rate (wt % of lubricating agent compared to PTFE resin) | 20.75 | 17.5 | 20.75 |
| | Average | | |
| Unit weight (oz/yd$^2$) | 0.6 | 0.4-0.7 | 0.4-0.6 |
| Air perm (cfm) | 0.901 | 0.2-0.4 | 1.0-2.5 |
| Mullen (psi) | 61 | 60-120 | >25 |
| Thickness (in.) | 0.002 | — | 0.003 |
| Peel Strength MD (lbf/in.) | 0.347 | 0.2-0.45 | >0.2 |
| Peel Strength XD (lbf/in.) | 0.343 | 0.2-0.4 | >0.2 |
| Tensile Elongation MD | 273% | — | >100% |
| Tensile Elongation XD | 103% | — | >40% |
| IPA Bubble point (psi) | 14 | — | 12-18 |
| MVTR (g/m$^2$/24 hrs) | 49904 | 50,000-85,000 | >70,000 |

Example No. 2

DuPont 603 A resin fine powder was mixed with 22 wt % of Isopar M using a V blender at ambient condition for about 20 min. The resin/isopar mix was wicked at 110° F. for 48 hours. The wicked PTFE/Isopar mix was blended with 3.8 wt % of activated nanocarbon using a V blender for about 30 min. The resin/isopar/carbon was shaped into cylindrical form (perform) by applying pressure of 100 psi using a billet press. The perform was extruded into a tape at a temperature 110° F. using a Ram extruder. The isopar was removed from the tape with thickness ~8 mil by passing it through series of hot Calendar rolls at a temperature of 250° F. The tape was stretched biaxially to form a porous PTFE membrane (stretched 5 times in the machine direction and 12 times in the transverse direction). The microstructure of PTFE membrane was stabilized by applying heat at temperature of 720° F.

The membrane is tested as per product test specifications and compared with GE standard commercialized membrane. It was found that the Nanocarbon additive dispersed uniformly within PTFE matrix and locked in the microstructure.

TABLE 2

Comparison of Example No. 2 with specifications for QMO 11 and QMO 8.

| Membrane Characteristics | Example No. 2 | QMO11 | QMO8 |
|---|---|---|---|
| Lube Rate (wt % of lubricating agent compared to PTFE resin) | 20.75 | 17.5 | 20.75 |
| | Average | | |
| Unit weight (oz/yd$^2$) | 0.5 | 0.4-0.7 | 0.4-0.6 |
| Air perm (cfm) | 0.922 | 0.2-0.4 | 1.0-2.5 |
| Mullen (psi) | 67 | 60-120 | >25 |
| Thickness (in.) | 0.002 | — | 0.003 |
| Peel Strength MD (lbf/in.) | 0.35 | 0.2-0.45 | >0.2 |
| Peel Strength XD (lbf/in.) | 0.243 | 0.2-0.4 | >0.2 |
| Tensile Elongation MD | 238 | — | >100% |
| Tensile Elongation XD | 73 | — | >40% |
| IPA Bubble point (psi) | 14 | — | 12-18 |
| MVTR (g/m$^2$/24 hrs) | 52395 | 50,000-85,000 | >70,000 |

Tensile strength and elongation were measured using ASTM D5035, and Mullen was measured using ASTM D751-00 Method A, procedure 1.

All disclosed and claimed numbers and numerical ranges are approximate and include at least some variation and deviation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composition comprising:
   a polytetrafluoroethylene resin;
   a lubricating agent comprising an isoparaffinic solvent; and
   a porous inorganic material;
   wherein a weight of the lubricating agent comprises between 15 and 25 percent of a weight of the polytetrafluoroethylene resin;
   wherein a weight of the porous inorganic material comprises up to 10 percent of the weight of the polytetrafluoroethylene resin; and
   wherein the porous inorganic material has at least one dimension less than 50 nm and has a specific surface area greater than 90 m$^2$/g.

2. The composition of claim 1, wherein the porous inorganic material comprises an activated nanocarbon, a carbon nanotube, a carbon fiber, a zeolite, a catalyst, or silicon dioxide.

3. The composition of claim 1, wherein the porous inorganic material comprises an activated nanocarbon.

* * * * *